United States Patent [19]
Kaempen

[11] 3,957,416
[45] May 18, 1976

[54] APPARATUS FOR MAKING COMPOSITE STRUCTURES

[75] Inventor: Charles E. Kaempen, Orange, Calif.

[73] Assignee: Kaempen Industries, Inc., Orange, Calif.

[22] Filed: Sept. 24, 1973

[21] Appl. No.: 399,986

Related U.S. Application Data

[62] Division of Ser. No. 161,536, July 12, 1971, Pat. No. 3,787,441.

[52] U.S. Cl. ............................. 425/470; 156/161; 156/189
[51] Int. Cl.² ........................................ B65H 81/00
[58] Field of Search ................... 425/470, DIG. 30; 156/161, 169, 172, 173, 191, 434, 349, 598, 189, 140, 143

[56] References Cited
UNITED STATES PATENTS

| | | | |
|---|---|---|---|
| 2,395,450 | 2/1946 | Browning | 156/349 |
| 2,622,623 | 12/1952 | Michaudet | 156/143 |
| 2,762,419 | 9/1956 | Prewitt | 156/189 |
| 2,845,658 | 8/1958 | Knibb | 156/598 |
| 3,272,672 | 9/1966 | Lampman et al. | 156/191 |
| 3,489,629 | 1/1970 | Rechin et al. | 156/189 |
| 3,502,527 | 3/1970 | Borden | 156/143 |
| 3,615,983 | 10/1971 | Palfreyman | 156/173 |
| 3,615,988 | 10/1971 | Richmond | 156/189 |
| 3,661,670 | 5/1972 | Pierpont | 156/172 |
| 3,813,098 | 5/1974 | Fischer et al. | 156/172 |

*Primary Examiner*—Al Lawrence Smith
*Assistant Examiner*—Robert C. Watson
*Attorney, Agent, or Firm*—Phillips, Moore, Weissenberger Lempio & Strabala

[57] ABSTRACT

A corrugated laminate comprises at least two superimposed plies of continuous filament strands bonded together by a hardened plastic resin. The plies are biaxially pre-tensioned prior to hardening of the resin which impregnates and bonds the strands together in a generally concave parabolic configuration at each corrugation. The laminate finds particular application to tubular structures, such as sewer pipe liner and underground tanks, which contribute to the control and improvement in the quality of the nation's environment.

The method and apparatus for making the laminate in the form of a desired composite structure comprises placing a first ply of unidirectional continuous filament strands upon one or more longitudinally spaced pairs of a gapped forming structure so that the ply bridges each forming gap. After the ends of the first ply are held in place, they are pressed and deflected into the forming gaps by a superimposed second ply containing pre-tensioned, unidirectional continuous filament strands oriented approximately at right angles to the filament strands of the first ply. The parabolic configuration formed at each corrugation of the laminate results from a substantially uniform pressure which is applied to the first ply by the second or deflecting ply. The filament strands of each laminate ply are thoroughly impregnated with the liquid resin which subsequently hardens to bond and maintain the laminate in its corrugated form.

5 Claims, 24 Drawing Figures

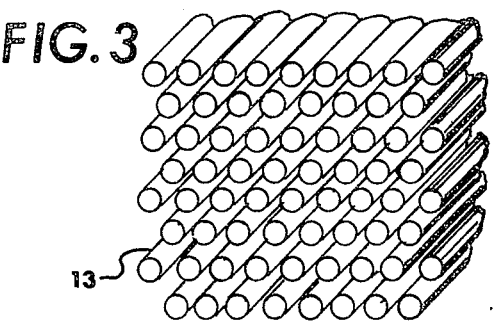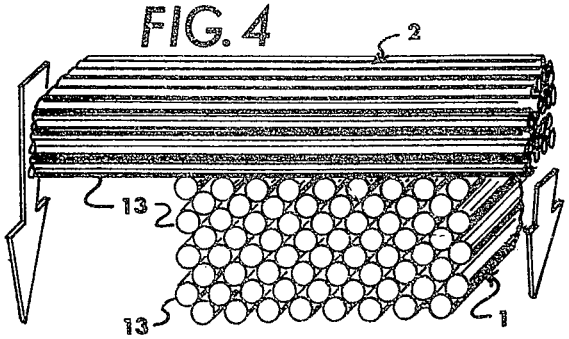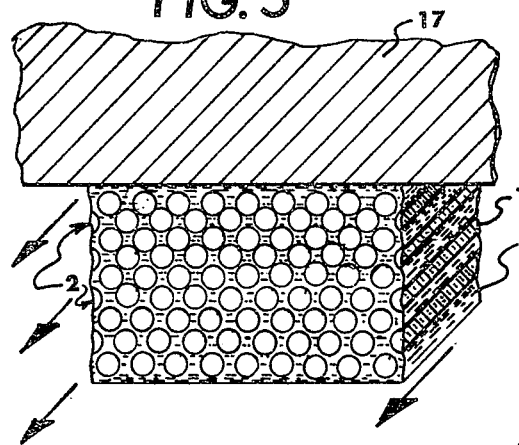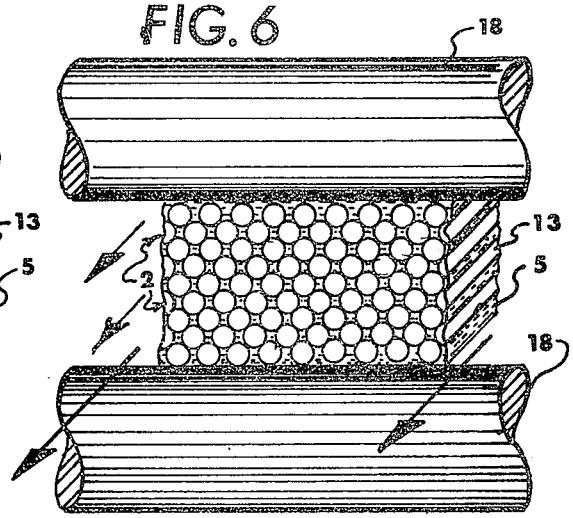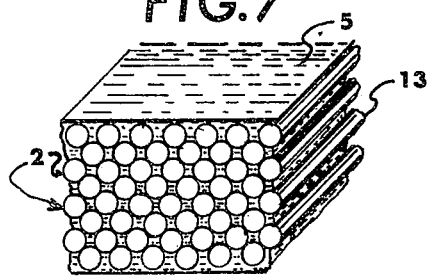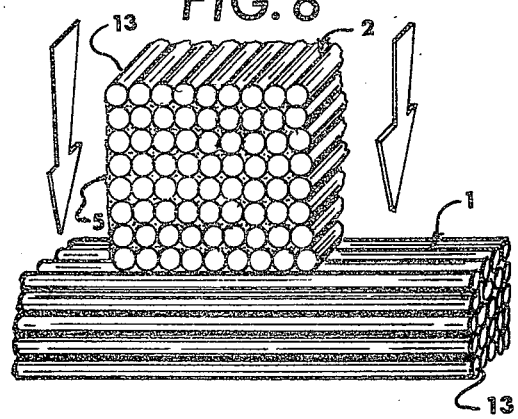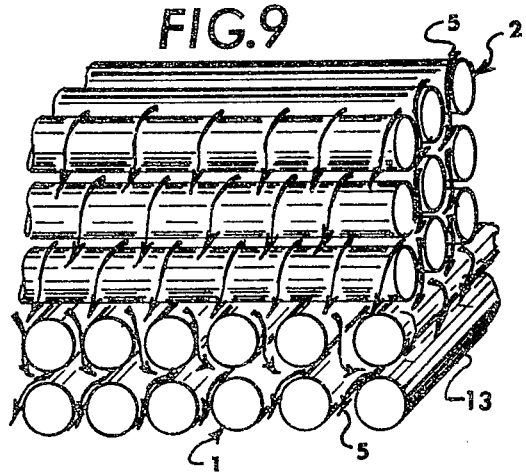

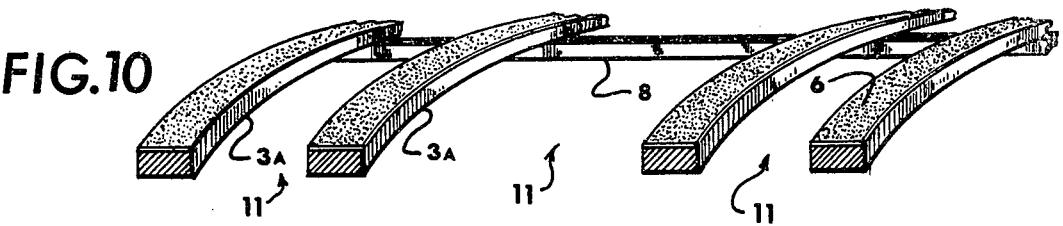
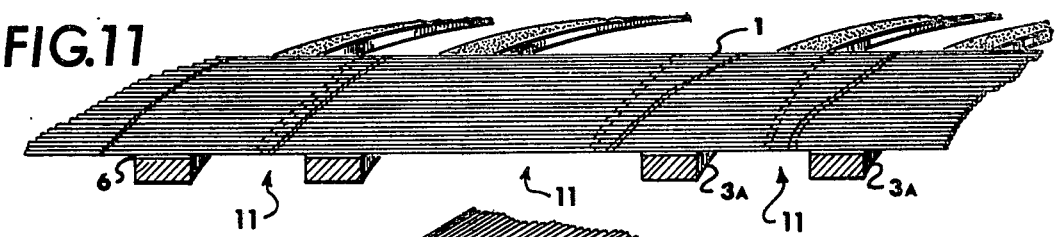
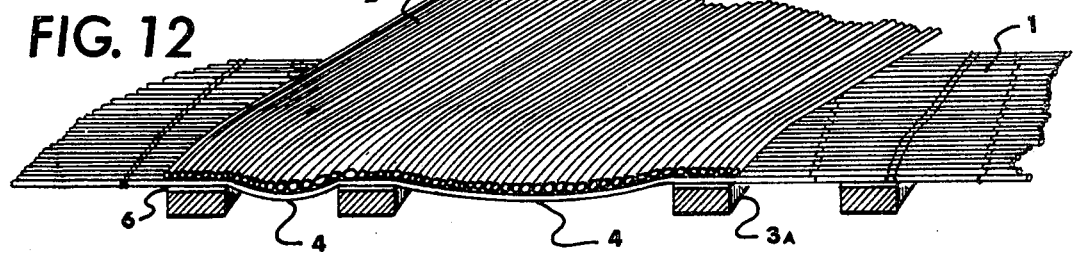
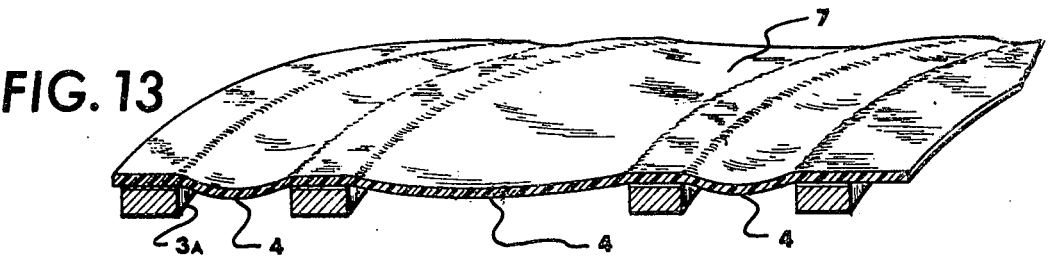
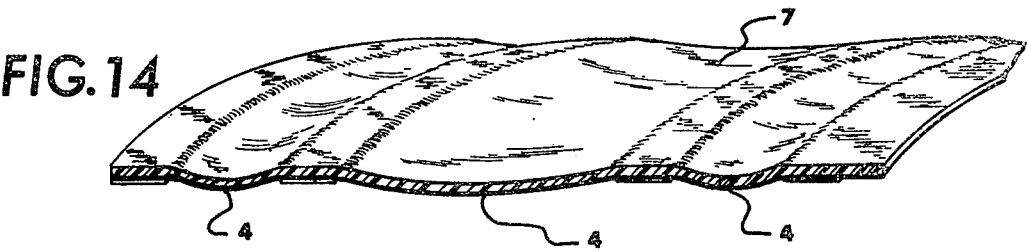

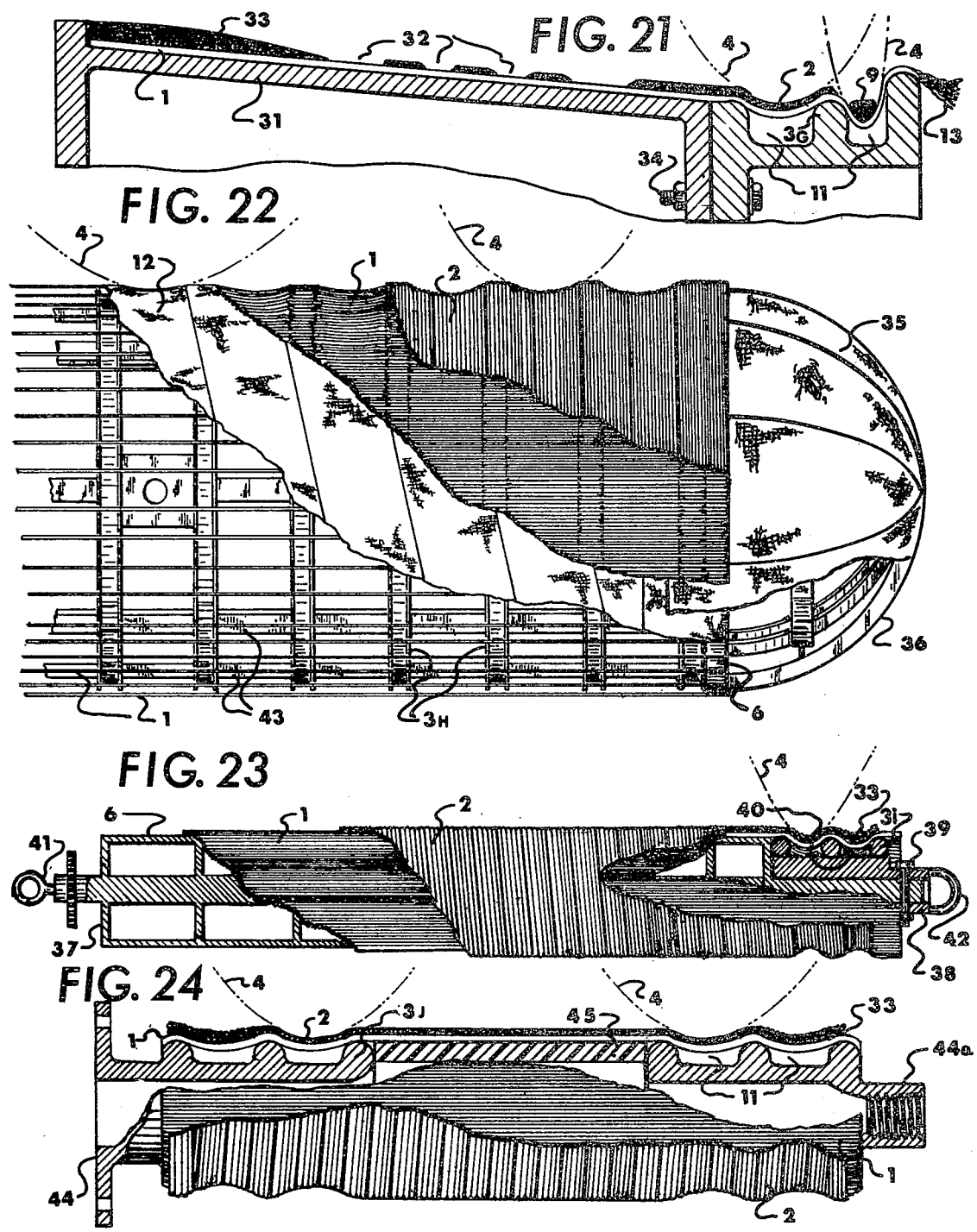

APPARATUS FOR MAKING COMPOSITE STRUCTURES

CROSS REFERENCE TO RELATED APPLICATION

This application is a divisional application of U.S. Pat. application Ser. No. 161,536, filed on July 12, 1971, now U.S. Pat. No. 3,787,441, by Charles E. Kaempen for "Composite Structure and Method for Making Some."

BACKGROUND OF THE INVENTION

This invention relates to a reinforced composite structure adapted for use in a wide variety of sealing and load transfer applications and to a method and apparatus for making same.

Thin wall sheet material is oftentimes corrugated to achieve an increase in its cross-sectional area and section modulus without increasing the section wall thickness. Corrugations in sheet material normally serve to increase the edge compression strength as well as the stiffness and beam strength of a panel or tube into which the sheet is configured. Conventional corrugated material used for pipe, panel and planking exhibit a cross-section having a uniform undulating concave and convex pattern. The corrugated pitch and depth of corrugated sheet material are governed by design criteria seeking the greatest section modulus from sheet material having a fixed wall thickness.

These criteria are satisfactory when the end use of conventional corrugated sheet material is principally one requiring stiffness and compression strength to resist deflection and buckling. Such conventional corrugated cross-sections are found less satisfactory when used to resist pressure, shear and tensile loads and to transfer such loads to adjacent structure. Therefore, design criteria, other than those which provide maximum section modulus for a given wall thickness, must be considered to obtain maximum strength and load transfer capability of corrugated plastic laminate material used as primary structure in tanks, tubes and joints.

It is well known in the art that when a flexible cable is suspended between two points and is uniformly loaded across the span bridged by the cable, the horizontal component of the resulting cable tension remains constant along the cable length. If the expression $W/T$ represents the constant ratio of the vertical component of load per unit of cable length $W$ to the horizontal component of cable tension $T$, then the expression $y = x^2 W/2T$ represents the equation of a parabolic curve into which the cable is deflected by the uniform span load if the lowest point of the cable is chosen as the origin of the coordinate system.

I have discovered that when a ply of continuous filament strands is uniformly pressed upon an underlying ply of filament strands, supported to bridge a forming gap, that the strands of the two plies are compacted uniformly. Such compaction functions to deflect the plies into a generally concave parabolic configuration in the forming gap into which the plies are deflected. When the plies are impregnated with and bonded together by an adhesive, such as a polymeric resin, the resulting composite structure will exhibit enhanced structural properties heretofore unobtainable in the types of structures under consideration.

Prior art methods for fabricating and compacting continuous filament strands contained in plastic laminates generally involve tensioning individual strands of warps or the passing of resin-impregnated filament strands through orifices or gaps configured to remove surplus resin from individual filaments. Such mechanical compacting and resin removal methods tend to break or otherwise damage substantial quantities of filaments, normally composed of brittle materials, such as glass.

Prior art forming methods and apparatus for fabricating corrugated plastic laminates generally involve the use of corrugating forms having continuous forming surfaces maintained in full contact with the formed laminate. Single-face vacuum bag molds, two-part matched die pressure molds and roller in groove type devices are typical of such conventional apparatus. The formed corrugated laminate is normally designed solely to produce sections which exhibit the greatest stiffness for the least laminate thickness and are satisfactory for fabricating laminate intended for use in secondary load applications, such as well panels, fencing and lightly loaded roofs.

Such methods and apparatus are unsatisfactory for fabricating corrugated plastic laminates intended for use as primary load bearing structure required to resist the transfer shearing and tensile loads. In addition, conventional corrugated plastic laminates oftentimes comprise polymerized mixtures of chopped glass fiber and resin combined with one or more layers of resin-impregnated woven glass fabric. Heretofore, corrugated laminates of this type have been expensive and difficult to fabricate and when fabricated, oftentimes exhibit relatively thick walls.

SUMMARY OF THE INVENTION

It is a primary object of the present invention to overcome the above, briefly described prior art problems and restrictions by providing a laminated composite structure which exhibits enhanced chemical and physical properties, such as bi-axial tensile strength, and a method and apparatus for expeditiously and economically making same. The laminated structure is preferably formed to contain at least one generally concave parabolic configuration or corrugation containing uniformly compacted filament reinforcements which inherently provide the above structural desiderata.

The method and apparatus for making such a corrugated composite structure may comprise the steps of placing a first or bridging ply of continuous filament strands across a forming gap defined between spaced support members, gripping and securing the ends of the strands on either side of the forming gap, transversely superimposing a second or deflecting ply of continuous filament strands over the first ply, pressing the second ply down to deflect the first ply into the forming gap under a substantially uniform load and adhesively securing the plies together with a cured and hardened adhesive, such as a polymeric resin. The resulting structure, when viewed in cross-section, will assume a generally concave parabolic configuration within the forming gap. The employment of a series of such forming gaps results in the formation of a corrugated structure having such a parabolic configuration formed at each corrugation.

Another embodiment of this invention comprises a composite structure formed by tensioning a first ply of dry filament strands, applying a second ply of resin-wetted filament strands transversely to the first ply, wetting the first ply with resin by capillarity and at least partially curing and hardening the resin to maintain all filament strands in tension.

If so desired, other materials or constructions can be incorporated into the basic two-ply laminate during fabrication, such as the support structure defining the forming gaps and additional reinforcing plies.

The laminated composite structure made in accordance with this invention, when fabricated, will exhibit enhanced corrosion resistance, sealing and load transfer capabilities, particularly useful in tank, tube and joint structures.

BRIEF DESCRIPTION OF THE DRAWINGS

Further objects of this invention will become apparent from the following description and accompanying drawings wherein:

FIG. 3 is an enlarged fragmentary perspective view of bridging strand filaments prior to their being compressed and compacted by deflecting strand filaments.

FIG. 4 is a similar view illustrating the compacting of the bridging strand filaments by the deflecting strand filaments.

FIG. 5 is a similar view illustrating apparatus for impregnating and deflecting strand filaments with resin.

FIG. 6 is a similar view illustrating apparatus for compacting resin-impregnated deflecting strand filaments.

FIG. 7 is a similar view illustrating surplus boundary layer resin accompanying moving resin-impregnated deflecting strand filaments.

FIG. 8 is a similar view illustrating resin-impregnated deflecting strand filaments being pressed upon dry bridging strand filaments to initiate capillary transfer of surplus boundary layer resin to dry bridging strand filaments.

FIG. 9 is a similar view illustrating the capillarity of liquid resin occurring between the superimposed deflecting and dry bridging strand filaments.

FIG. 10 is a fragmentary perspective view typifying forming and gripping apparatus of the present invention.

FIG. 11 is a similar view illustrating the placement and orientation of a bridging ply on the apparatus.

FIG. 12 is a similar view illustrating the transverse placement of a deflecting ply on the bridging ply.

FIG. 13 is a similar view illustrating a completed corrugated composite structure comprising the bridging and deflecting plies impregnated and bonded together by a polymeric resin and the integrated forming and gripping apparatus.

FIG. 14 is a view similar to FIG. 13, but showing the forming and gripping apparatus removed therefrom.

FIG. 21 is a sectional view of separable forming apparatus for forming the illustrated composite structure thereon.

FIG. 22 is a partially sectioned, side elevational view of a tank structure made integral with forming apparatus.

FIG. 23 is a similar view of a separable forming apparatus for forming the illustrated composite structure thereon.

FIG. 24 is a similar view of a high tensile strength joint structure made with integral forming apparatus.

DESCRIPTION OF THE PREFERRED EMBODIMENT

Figure 1:
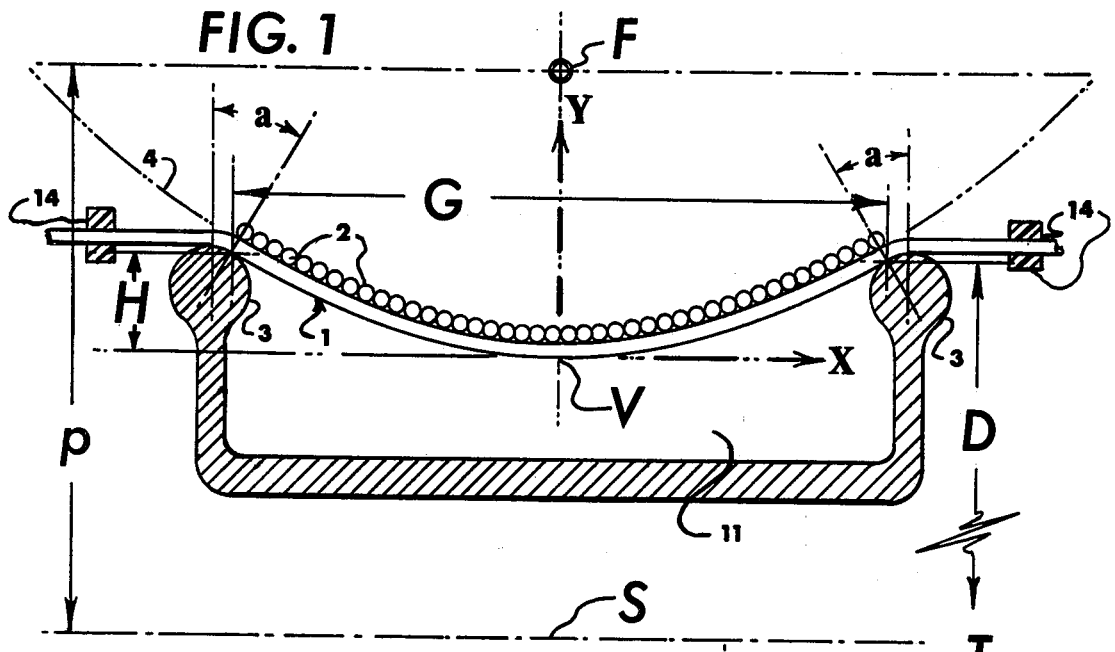
FIG. 1 is an idealized section of a laminated composite structure formed into a concave parabolic configuration in accordance with the teaching of this invention.
Figure 2:
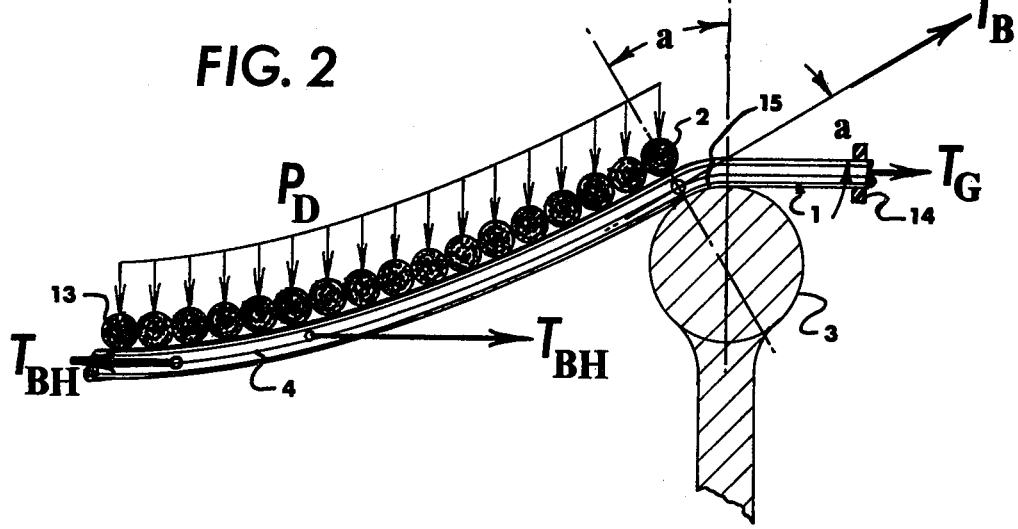
FIG. 2 is an enlarged fragmentary section of FIG. 1, illustrating load and stress vectors associated with the deflection of the structure into its parabolic configuration.

FIGS. 1 and 2 schematically illustrate design criteria and vector analyses of a laminated composite structure exhibiting a concave parabolic configuration which is characteristic of this invention. The structure, in its broadest application, comprises a first or bridging ply warp of continuous filament strands 1 and a second or deflecting ply of continuous strands 2.

Each filament of each strand is preferably continuous and each strand preferably contains from 204 to 12,240 (1 end to 60 end) individual filaments. The filaments may be organically (glass, metal, carbon, etc.) or inorganically (cellulose, plastics such as Nylon or Teflon, etc.) composed. The preferred filament for the hereinafter described structures constitutes glass, having an O.D. of 0.0008 in. or less. A standard glass filament has a 0.0005 in. O.D.

The hereinafter more fully described hardened "adhesive means", used for bonding strands of superimposed plies together, may be selected from the broad group of available thermosetting or thermoplastic resins suitably composed for such bonding purposes. As is well known in the art, the thermosetting resins may be phenolics, polyesters, epoxies, polyurethanes or any suitable mixture thereof. The thermoplastic resins may comprise polyethylene, nylon, polypropylene, rubber or any suitable mixture thereof. The polyesters are normally utilized such as in the hereinafter described example, since they are readily available, relatively inexpensive and are suitable for many composite structure applications.

The forming apparatus is typified by a pair of spaced support members 3 separated by a forming and tensioning gap 11, having a width G. Gripping means 14, such as standard clamping mechanisms or an adhesive, are employed to grip the free ends of strands 1 with a resisting tensile force $T_G$. Bridging strands 1, extending in the direction of horizontal axis X, are uniformly tensioned and deflected into gap 11 by deflecting strands 2 which are subjected to a substantially uniform load applied in the direction of vertical axis Y.

The deflecting strands comprise filament reinforcements oriented transversely and preferably approximately at right angles relative to the filament reinforcements of the bridging strands. The configuration of the resulting two-ply laminate, containing bi-axially orientated filament reinforcements, generally takes the form of a concave parabola 4. The parabolic configuration may be defined by the equation $x^2=2py$, with reference to an $x$ and $y$ coordinate system having its origin at the parabola vertex V. The distance $p$, between the focus F and the parabola's directrix S, is equal to the ratio of the horizontal unit stress component $T_{BH}$ to the deflecting pressure $P_D$.

FIG. 2 illustrates the load and stress vectors associated with the deflected filament reinforcements 13 of strands 1 and 2. $T_B$ is the increased unit stress produced in filament reinforcements 13 which are deflected about a forming support edge 15 by an amount of warp angle $a$. The magnitude of the deflection stress $T_B$ is equal to the bridging strand gripping stress $T_G$ multiplied by the expression $e^{fa}$. The base of the Napierian system of logarithms, $e$, equals 2.718+ and $f$ equals the coefficient of friction between bridging strands 1 and support surface 15 which it contacts when deflected through wrap angle $a$, measured in radians.

It has been determined that if the bridging strands initially comprise dry filaments, when deflected, that the value of $f$ will vary in the approximate range of from 0.3 to 0.5, primarily depending upon the smoothness of support surface 15. If the bridging strand filaments are deflected during or after their impregnation by liquid polymeric resin, for example, the value of $f$ is reduced and varies in the approximate range of from 0.1 and 0.2. $T_{BH}$, the horizontal component of unit stress developed in the deflected bridging strand, is equal to $T_B\cos a$, and remains a constant value along the entire deflected portion of the bridging strand.

Figure 15:
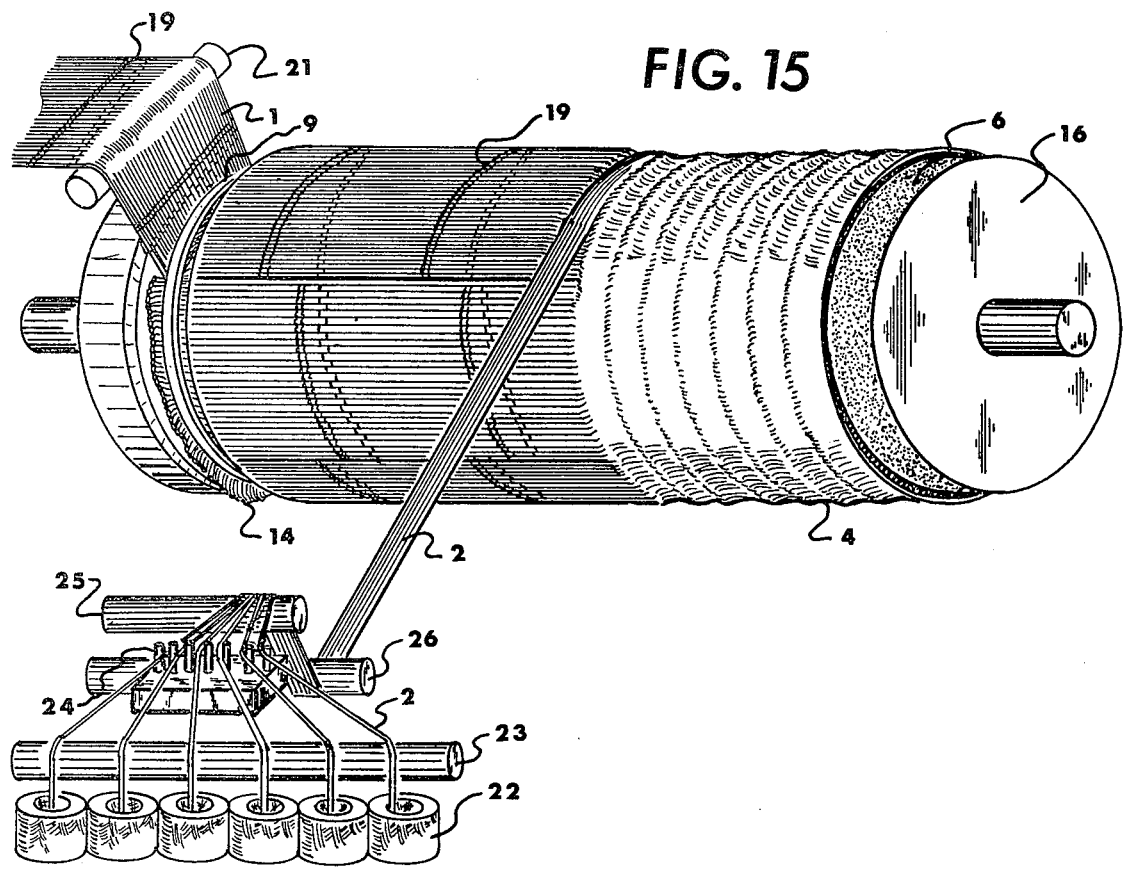
FIG. 15 schematically illustrates a method and apparatus for forming a corrugated shell, having sections similar to that shonw in FIG. 14.

If the deflecting strand is placed upon the bridging strand by filament winding apparatus, such as that depicted schematically in FIG. 15, then the deflecting pressure $P_D$ can be calculated from the following relationships:

D = Diameter of mandrel 16 upon which bridging strands 1 are placed.

$T_{WS}$ = Wet tension placed on each deflecting strand 2 after the strand is impregnated with polymeric resin 5 by passing beneath an impregnating bar 17 and by passing through squeegee bars 18 to compact the wetted filament reinforcements and remove surplus resin.

$n_D$ = Number of strands 2 per inch of width of the deflecting ply.

$W_D$ = Width of the deflecting ply.

$T_D$ = Unit tension per inch of deflecting ply width; equals $n_D T_{WS}$.

$T_{DW}$ = Total tension in the deflecting ply; equals $T_D W_D$.

R = Radial force per inch of mandrel semiperimeter imposed by the deflecting ply upon the bridging ply; equals $4T_{DW}/3.1416D$.

G = Gap width (FIG. 1) between each pair of forming supports 3 upon which the bridging ply is placed.

$P_D$ = Deflection pressure, due to radial force R, uniformly applied to the bridging ply across gap 11; equals R/G.

These relationships, as employed in the following examples, provide a method for forming tubular corrugated plastic laminates having the desired corrugation depth H for a given gap width G (FIG. 1).

Many of the standard terms used herein were taken from the 1970–1971 *Modern Plastics Encyclopedia*, the 1969 *ASME Boiler and Pressure Vessel Code* and numerous other sources which precisely define such terms.

EXAMPLE I

FIG. 15 illustrates a method and apparatus for making a corrugated composite structure in cylindrical shell form, having a concave parabolic configuration at each corrugation. Applying the above theoretical analyses thereto, depth H of each corrugation is equal to 0.7 inches and corrugation width G is equal to 4.75 inches (FIG. 1). The two-ply shell is formed on a mandrel 16, having an outside diameter of 48 inches.

It can be further seen in FIG. 1 that $H=y$ and $G=2x$. The required parabolic contour will consequently have a value of $p$ equal to $x^2/2y$ or $G^2/8H$ or 4.029 inches. Since $p$ also equals the ratio $T_{BH}/P_D$, the required horizontal component of the bridging deflection stress $T_{BH}$ (FIG. 2) equals $4.029 P_D$. If it is assumed that $T_{WS}$ equals 2 pounds and that $n_D$ equals 12, the unit tension $T_D$ of the deflecting ply is 24 pounds per inch of ply width. If the deflecting ply width is assumed to be 6 inches, then the total tension $T_{DW}$ in the deflecting ply equsl 144 pounds.

For a mandrel diameter of 48 inches, the resulting radial force per inch of mandrel semiperimeter equals 3.82 pounds per inch. The deflection pressure $P_D$ is 0.805 pounds per square inch. To produce the desired corrugations, the horizontal unit load component $T_{BH}$ equals 4.029 $P_D$ or 3.24 pounds per inch of bridging ply width. Assuming the bridging strand wrap angle $a$ equals 30° or 0.523 radians, the unit force $T_B$ per inch of deflected bridging ply width is equal to 1.155 $T_{BH}$ or 3.742 pounds per inch. Assuming the bridging ply is deflected while still dry, the coefficient of friction between the forming support surface and the bridging ply will equal approximately 0.364 and $e^{fa}$ approximately 1.21. The required gripping force $T_G$ then becomes approximately 3.09 pounds per inch of bridging ply width.

The above analytical relationships, characterizing cylindrical structures made with one or more corrugations, can be conversely employed for such purposes as quality assurance and control. By measuring the depth H, of a corrugation associated with a given forming gap G, an equation of the resulting parabolic configuration can be readily obtained to determine the value of $p$, the focus to directrix distance and the ratio of $T_{BH}$ to $P_D$. The equation characterizing the parabolic contour associated with corrugated plastic laminates made in accordance with this invention is thus:

$$p = G^2/8H = T_{BH}/P_D$$

The preferred range for p in most tank, liner and joint applications is from 1 to 400.

This equation and measurements of the unit bridging strand gripping force $T_G$ further made possible an accurate determination of deflecting strand filament tension $T_{WS}$ in each individual strand, as explained in the following example.

EXAMPLE II

Corrugation depth H and gap width G (FIG. 1) were measured and found to be 0.5 inch and 3.0 inches, respectively, on a structure formed on a mandrel 16

(FIG. 15) having an O.D. of 24 inches. The focus to directrix distance $p$ of the resulting parabola was equal to $x^2/2y$. Considering the vertex of the parabola to be at the origin of the $x-y$ coordinate system, $x$ equaled 1.5 inches and $y$ equaled 0.5 inch. The value of $p$, the ratio of $T_{BH}$ to $P_D$, equaled 2.25. The gripping force $T_G$ of the bridging strand bonded to adjacent support members 3 was measured at 100 pounds per inch of ply width. For the wrap angle of 30° and a friction coefficient of 0.362 the unit force $T_B$ per inch of deflected bridging ply width, was found to be approximately 121 pounds per inch. The horizontal component $T_{BH}$ was approximately 105 pounds and the deflecting pressure $P_D$ therefore was equal to 47 psi.

For the gap width G of 3 inches, the radial force R per inch of mandrel semiperimeter was 140 pounds. The total tension force $T_{DW}$ of the deflecting ply which produced the parabolic corrugation on the 24 inch diameter mandrel was found to be 2,640 pounds. For the deflecting ply width of 3 inches, the unit tension per inch of deflecting ply width $T_D$ was equal to 880 pounds. Six plies of deflecting strands were placed consecutively upon the bridging ply. Since each deflecting ply contained 12 strands per inch of width, the total number $n_D$ of strands per inch of deflecting ply width was equal to 72. The average winding tension force $T_{WS}$ for each individual strand was thus determined to be about 12 pounds which is approximately one-sixth of the breaking strength of a 20 end strand of glass filament reinforcement.

Bridging strand gripping force is an important factor governing the formed parabolic corrugation. This force is generally far below 100 pounds per inch for dry filament reinforcement due to slack and irregularities incorporated in a typical continuous filament strand during the application to forming members. Therefore, it is also possible to determine the relative quality of bridging strand tensioning by determining the equivalent unit gripping force associated with a given wet strand winding tension $T_{WS}$.

FIGS. 4–9 relate to filament compaction methods and apparatus which increase the cross-sectional area density of continuous filament reinforcements 13 (FIG. 3) of a strand 1 to thereby increase the strength of corrugated laminates containing superimposed layers of bridging and deflecting strands of a given number.

FIG. 4 illustrates the uniform compaction of dry filaments 13 of a first or bridging strand 1 by pre-compacted filaments 13 of a second or deflecting strand 2. In particular, the bridging strand filaments are uniformly compacted when pressed into a parabolic configuration 4 (FIG. 1), by the compacted and uniformly tensioned deflecting strand filaments.

Figure 16:
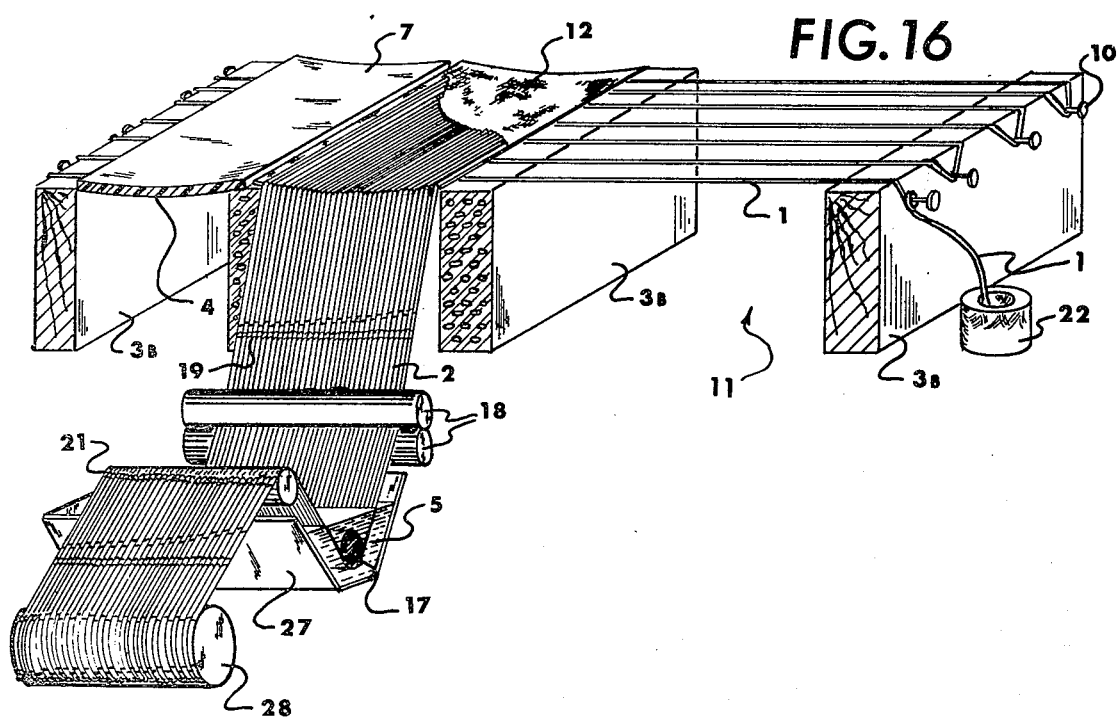
FIG. 16 schematically illustrates a method and apparatus for forming generally straight longitudinal corrugated panels.

FIG. 5 illustrates the simultaneous impregnation and compaction of bridging strand filaments 13 by pressing a moving bridging strand 2 against the bottom surface of a stationary impregnating bar 17, such as that depicted in FIG. 16.

FIG. 6 illustrates the further compaction of wetted filaments 13 when they are moved between stationary squeegee bars 18, also schematically shown in FIG. 16. The stationary squeegee bars are suitably spaced to produce the desired filament compaction consistent with minimum crushing and non-fracture of the filament reinforcements.

FIG. 7 illustrates resin-impregnated and compacted deflecting strand filaments, compacted at a high traverse speed through stationary squeegee bars 18, coated with a small surplus of resin 5 required for high speed deflecting strand lubrication and for the resin boundary layer which protects individual filaments.

FIG. 8 illustrates further compaction of filaments 13, contained in a deflecting strand, by using capillary forces to pump surplus resin 5 out of the interstices of deflecting strand 2 and into the capillary interstices associated with the underlying filaments of a dry bridging strand 1.

FIG. 9 illustrates the use of capillary forces to coat and impregnate dry underlying filaments, contained in a bridging strand 1, with overlying, resin-impregnated filaments of deflecting strand 2.

FIGS. 10–14 depict sequential method steps for making a corrugated composite structure, such as the cylindrical shell formed by the apparatus shown in FIG. 15. Support and forming members 3A may constitute individual cylindrical rings, adjacent coils of a helical spring configuration or other parallel support members suitably constructed to define forming gaps 11. Longitudinal members or longerons 8 may be suitably secured to support members 3A by welds, bolts or the like to longitudinally space and support the support members during laminated fabrication. Adhesive 6, such as a partially cured polymeric resin, may be pre-applied to exterior surfaces of the support members (FIG. 10) to grip strands 1 of the bridging ply at the sides of each gap 11 (FIG. 11) upon hardening thereof.

FIG. 12 illustrates the concave parabolic configurations 4 which are produced when strands 2 of the transversely positioned deflecting ply are pressed on strands 1 to impose a substantially uniform load thereon. FIG. 13 illustrates the completed two-ply corrugated structure 7 which results after the two plies have been impregnated with a liquid resin which subsequently cures and hardens to bond the plies together. The corrugated structure is characterized by the formation of a connected series of concave parabolic configuration 4, similar to that illustrated in FIG. 1, at each corrugation. If desired, members 3A may remain bonded to the completed structure to serve as an integrated structure thereof. FIG. 14 illustrates the corrugated structure as it would appear upon separation and removal of such members therefrom.

FIG. 15 schematically illustrates a method and apparatus for making a corrugated cylindrical shell having sections similar to that shown in FIG. 14. Cylindrical mandrel 16 preferably comprises annular forming and support members, similar to members 3A and 8 of FIGS. 10–13, which define forming gaps (not shown) for accommodating the deflected portions of continuous bridging strands 1 of a first ply therein. Gripping means for holding the free ends of the first ply may comprise an annular restraining strap or belt 9 and/or hardened adhesive coating 6.

The strand dispensing means may comprise the two types illustrated in FIG. 15, either one of which could be utilized to form the first and/or second ply. The first type comprises a roller or stationary bar 21, arranged to support, spread, flatten and form strands 1 into the first or bridging ply. If so desired, the strands may be dispensed as a fabric containing sufficient weft 19 to hold the filament reinforced strands in close parallel relationship with respect to each other.

The second type of dispensing means may comprise vertically disposed bobbins 22 which cooperate with a collecting comb 24 and rolls 23, 25 and 26 to form individual strands 2 into the second or deflecting ply and to place the ply upon the mandrel. In particular, the bobbins are positioned to feed the continuous strands upwardly through the collecting comb and over the smooth roll or strand feed means 23 upon rotation of mandrel 16. The collected strands are subsequently pulled over roll or strand straightening means 25 and under roll or ply width control means 26.

Rolls or bars 23, 25 and 26 of the strand dispensing means may be configured to be tapered longitudinally and/or may comprise pins or annular grooves to aid in guiding the strands prior to their placement upon the mandrel. The strand dispensing means preferably further includes means (not shown) for moving the dispensing means leftwardly at a predetermined linear speed, parallel to mandrel 16, during the spiral application of the deflecting ply.

As suggested above, motive means, such as an electric motor and integrated drive system (not shown), will normally be provided to simultaneously rotate the mandrel at a predetermined speed. The hardenable adhesive means, such as a liquid polymeric resin, may be applied to strands 1 and/or 2 prior to their application to the mandrel. Alternatively, the adhesive means may be applied to the dry strands, after the application of one or both of the plies to the mandrel, by conventional spraying, brushing or similar techniques.

FIG. 16 illustrates a method and apparatus for making a longitudinally straight corrugated composite structure, exhibiting a concave parabolic configuration at each formed corrugation, in generally flat panel form in contrast to the above described cylindrical form. A first or bridging ply for dry filament strands 1 may be dispensed from one or more bobbins 22. The strands may be mechanically tied and gripped at each end of the formed panel by gripping means, such as pins 10. The pins are sufficiently strong to hold the bridging strands taut as they span forming gaps 11, defined between laterally spaced and vertically disposed forming supports, shown in the form of wood or concrete block members 3B.

The second and third plies may respectively comprise a pre-applied resin-impregnated and distensible woven fabric 12 and overlying deflecting strands 2, containing sufficient weft 19 to hold the strands in taut, parallel relationship. Dispensing and impregnating means for the third ply may comprise a receptacle 27 constructed to contain a liquid polymeric resin 5 having the desired temperature and viscosity. A roller feed 28, a guide bar or roll 21, a warp impregnation bar 17, and a compaction means 18 cooperate to precisely feed and compact the resin impregnated deflecting strands together.

Resin-impregnated fabric 12 and strands 2 automatically impregnate dry strands 1 of the underlying first or bridging ply with resin by capillarity (FIG. 9). The composite structure is deflected into parabolic configurations primarily by the weight of the second and third plies and the resin, under the influence of gravity. Following thorough impregnation and deflection of the bridging strands, the resin is cured and hardened to form a three-ply corrugated panel 7 having a section exhibiting one or more parabolic configurations 4 (FIG. 1).

FIGS. 7–20 illustrate typical cross-sections of multi-ply corrugated composite structures, constructed in accordance with the methods and apparatus disclosed above, exhibiting a concave parabolic configuration 4 at each corrugation. It should be understood that one or more of the hereinafter described plies may be pre-wetted with a liquid polymeric resin, for example, or such resin may be applied to the structure after it is deflected in its dry state.

Figure 17:
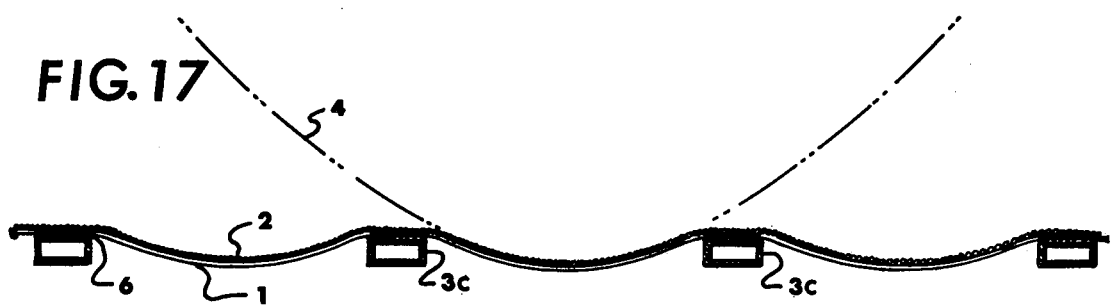
FIG. 17 is a cross-sectional view particularly illustrating characteristic concave parabolic configurations formed on a corrugated two-ply composite structure, similar to the structure shown in FIG. 13.

FIG. 17 depicts a two-ply composite structure bonded to uniformly spaced forming and support members 3C. A first or bridging ply of continuous filament strands 1, oriented perpendicular to the longitudinal axes of the support members, is bonded to upper surfaces of the support members by a polymeric bonding resin 6. Strands 2 of a second or deflecting ply are orientated perpendicular to and uniformly pressed upon the strands of the first ply to deflect them into the forming gaps. A generally flat configuration, comforming to the flat top surface of each support member, connects each adjacent pair of corrugations.

Figure 18:
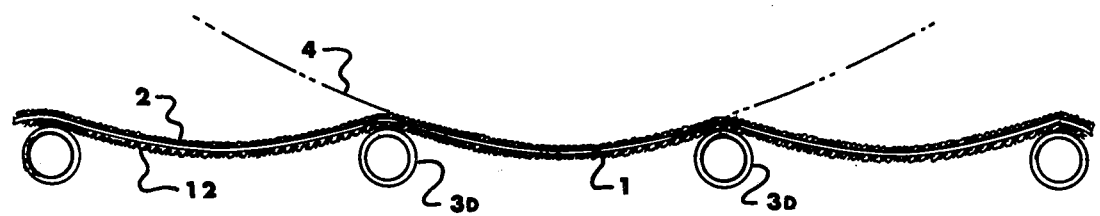
FIG. 18 is a similar view of a corrugated three-ply composite structure.

FIG. 18 depicts a three-ply composite structure comprising a first taut and distensible fabric ply 12 placed upon support members 3D, a second ply of bridging strands 1 oriented perpendicular to the support members and a third ply of deflecting strands 2 oriented perpendicular to strands 1. The third ply is uniformly pressed upon the second ply to distend the first ply fabric and to deflect the first and second plies into the forming gaps to form the corrugated structure upon hardening of the impregnating resin. A convex configuration, conforming to the arcuate shape of a respective member 3D, connects each adjacent pair of corrugations together.

Figure 19:
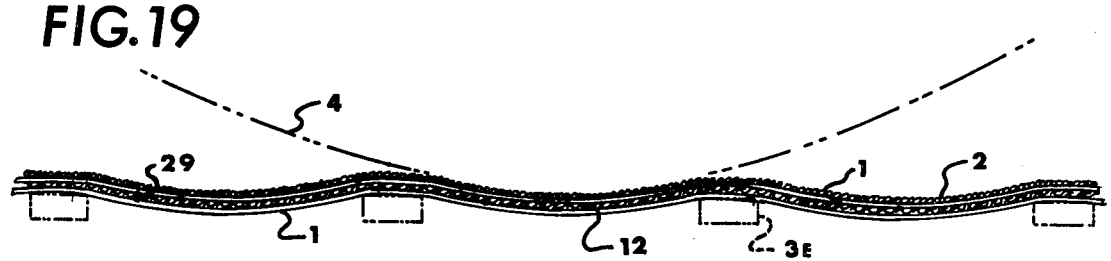
FIG. 19 is a similar view of a corrugated four-ply composite structure.

FIG. 19 depicts a four-ply composite structure comprising a first ply of bridging strands 1, adhesively secured to removable support members 3E. The first ply contains a sufficient number of spaced strands (when viewed in top plan) to structurally support free edges 29 of an overlying second ply comprising distensible fabric ribbons. Bridging strands 1 of a third ply, substantially identical in construction and orientation to the first ply strands, are superimposed over the second ply. A fourth ply comprises strands 2 applied to the other plies with sufficient pressure to deflect them into a connected series of parabolic corrugations 4 in the forming gaps defined between the support members. The compacted structure may be removed after the impregnating resin or other suitable adhesive means is cured and hardened.

Figure 20:
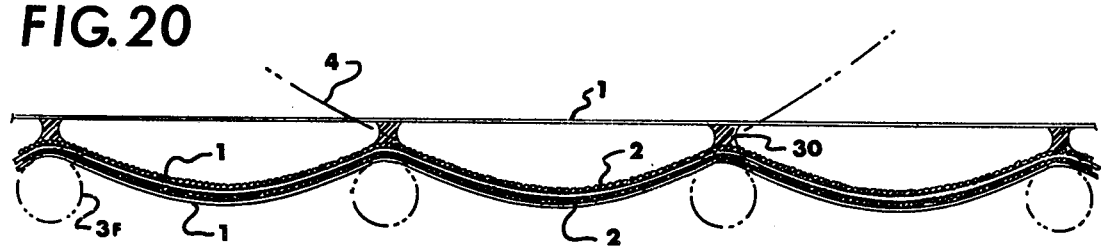
FIG. 20 is a similar view wherein a corrugated four-ply composite structure is integrated into a double-wall construction.

FIG. 20 depicts a double-wall composite structure comprising first and third plies of closely spaced bridging strands 1 with the first ply being adhesively secured on removable support members 3F. The bridging strands are uniformly deflected into the forming gaps by perpendicular strands 2 of the second and fourth plies. Prior to the hardening of the impregnating resin, employed to seal and bond the individual filament strands together, supplemental elongated support means 30 may be bonded to the four-ply corrugated structure. Spaced (when viewed in top plan) filament strands 1 of the fourth ply are bonded to the outer surfaces of supplemental support means to form a second wall to increase the overall section modulus and beam strength of the formed composite structure.

FIGS. 21, 22, 23 and 24 illustrate additional methods and apparatus for forming corrugated composite structures each exhibiting at least one concave parabolic configuration 4 therein. FIG. 21 depicts an annular two-part forming and support mandrel comprising a corrugation forming part, having annular support members 3G, attached by bolts 34 to a tapered part 31. The formed structure may comprise a dry first ply of circumferentially spaced (when viewed in top plan) bridging strands 1 and overlying second plies of deflecting strands 2. The first ply strands can be gripped at their left end on part 31 by cured and hardened resin means or by a circumferential strap (not shown) and at their right end by circumferentially wrapped and resin-impregnated strands 9. Strands 9 function to pre-tension dry strands 1 prior to the final fabrication steps.

The second plies may be spaced apart longitudinally on part 31 by gaps 32 and one or more thereof may be formed with a variable sectional thickness, such as that shown at 33. The second plies, applied to the corrugation forming part, deflect the underlying bridging strand portions into a second dissimilar concave parabolic configuration 4 in forming gap 11 defined by annular support members 3G.

FIG. 22 illustrates a semi-monocoque tank structure comprising integrated steel rings 3H and longerons 43 which form a steel skeleton construction having an impermeable corrugated shell formed thereon. A first ply, comprising circumferentially spaced bridging strands 1, is placed upon the skeleton construction which is secured to hemispherical end steel forming structures 36 (one shown). The free ends of the strands are secured to the skeleton construction by an adhesive coating 6.

A second helically wrapped ply comprises distensible and resin-impregnated sealing fabric 12 woven to include continuous deflecting strands. The bridging strands are thereby deflected by the second ply at least partially into the forming gaps defined between rings 3H. A resin-impregnated sealing fabric 35, similar in construction to fabric 12, is placed upon end structures 36 to overlap the ends of the second ply.

A third ply, comprising close-spaced dry bridging strands 1 formed as a fabric, is placed upon the second ply and held in place by the uncured resin which impregnates the second ply. A fourth ply, comprising polymeric resin-impregnated deflecting strands 2, is helically wrappped upon the third ply to deflect the underlying plies into their final corrugations or concave parabolic configurations 4. The strands of the third ply are automatically impregnated with resin by capillarity (FIG. 9) from the resin-impregnated second and fourth plies. Curing and hardening of the resin results in a sealed tank capable of resisting high compressive stresses, such as those encountered during water submergence.

EXAMPLE III

A tank structure, similar to that shown in FIG. 22, was made as follows.

Each bridging strand 1 comprised a single strand of 20 end glass roving (e.g., Owens-Corning roving 891-AA) made from E-type glass containing approximately 4000 "K" filaments per strand with each filament having a diameter of 0.0005 inch. The strands were circumferentially spaced apart approximately one inch and were adhesively gripped by polyester resin 6 on a 2 in. × 1 in. × ⅛ in. channel ring rolled with its flanges facing inward. The resin was an uncured but gelled and unsaturated isophthalic polyester resin. The resin was catalyzed with methyl ethyl ketone peroxide (MEKP) mixed with the resin in a proportion of 2 parts MEKP to 100 parts resin.

The resin contained a solution of 5%, by weight, of melted paraffin wax added to 95%, by weight, of styrene monomer. One pound of such solution was added to each 100 pounds of resin mixture. The purpose of adding the wax-styrene solution to the polyester resin was to promote curing of the resin on the air-exposed surfaces of the formed tank structure by providing an air barrier thereat. Such barrier is particularly useful in tanks adapted for chemical storage purposes. It should be noted that mandrels 31 and 37, for example, would not normally require addition of the wax styrene solution to the employed polyester resin since the smooth mandrel surfaces themselves provide such an air-barrier which promotes curing of the resin deposited on the internal surfaces of the formed composite structure.

Rings 3H of the steel tank frame had an I.D. of 95 inches and were longitudinally spaced apart 12 inches, between centers and constituted 2 in. × 1 in. × ⅛ in. steel channel rolled with their edges facing outwardly. The rings were welded to nine longerons 43 made of the same size channel. Tanks having cylindrical lengths up to 27 feet were made by the method disclosed in this example.

The second ply of distensible fabric 12, containing deflecting strands of continuous filament glass reinforcement tightly woven into a box weave pattern, weighed approximately 6 ounces per square yard. The type used in the present example had a width of 38 in. and a silane coupling finish of S-910. Such fabric was impregnated with the above-mentioned unsaturated isophthalic resin, having a composition of 1 mol of isophthalic acid to 1 mol of maleic anhydride with 2.5 mols of propylene glycol and a molecular weight in excess of 3100. The resin exhibited a room temperature gel time in excess of 5 hours and when used to impregnate the woven sealing fabric was not thinned with styrene monomer but was catalyzed by adding 2%, by weight, of MEKP thereto along with the above-mentioned wax-styrene solution.

Fabric 12 was helically wrapped upon the rotating tank frame after it passed through resin impregnating apparatus, similar to that schematically depicted in FIG. 16. A single ply of sealing fabric 35 was next applied to tank ends 36. The fabric comprised a tightly woven glass fabric having a 38 in. width and a weight of approximately 25 ounces per square yard. The tank end sealing fabric was impregnated with resin by the same apparatus that was used to impregnate sealing fabric 12.

Each tank end was made by sequentially placing eight overlapped (by 1 in.) pieces of 25 ounce per square yard and 84 in. × 38 in. woven glass fabric 35 on the 32 equally spaced hemispherical channel members 36. The fabric was positioned to extend 6 inches longitudinally upon cylindrically formed fabric 12. Each piece of fabric was impregnated with the same polyester resin used to impregnate distensible fabric 12. The gel time of impregnated fabric 35 was substantially reduced by brushing a solution containing one part of cobalt napthenate and four parts of styrene monomer upon fabric 35.

Following placement of fabric 35, a second ply of closely-spaced dry bridging strands or warp 1, tied together by weft threads, was placed upon the uncured polyester resin covering the first ply of distensible fabric 12. The tackiness of the polyester resin served to hold the bridging strands on the assembly during mandrel rotation. The approximately 5 hour gel time, characterizing the resin, provided adequate working time to apply all eight pieces of the bridging ply, each piece having a width of 38 inches. The dry second ply was placed upon the resin-wetted first ply by apparatus similar to that schematically depicted at 21 in FIG. 15.

The second or bridging ply fabric material contained 13 glass filament strands per inch of width, the strands being secured together by weft threads of glass yarn such as depicted at 19 in FIG. 15 and FIG. 16. Such a unidirectional strength glass fabric had a weight of 0.875 pound per square yard. The second ply was applied to extend the entire length of the tank to overlap the outer surface of fabric 35, containing a sufficient amount of uncured resin to provide capillary adhesion to the ends of the second layer.

A third ply of resin impregnated deflecting strands 2, woven into a 38 inch wide glass fabric, was processed through fabric impregnating apparatus of the type schematically depicted in FIG. 16. The fabric was circumferentially wrapped upon the dry longitudinal bridging ply thereby causing the bridging strands to deflect into a concave parabolic contour 4 between each pair of annular rings 3H. The impregnating polyester resin, impregnating the third ply, was thinned to facilitate filament impregnation by adding 1 quart of styrene monomer to 4 quarts of resin and was catalyzed by adding 80 cubic centimeters of MEKP to 5 quarts of thinned resin.

The free end of the third ply fabric, comprising deflecting strands 2, was edge bonded to the underlying second ply by brushing a solution of cobalt napthenate and styrene upon the resin impregnated fabric to accelerate gel and bonding. The tank frame was turned one revolution to provide one circumferential wrap prior to initiation of the helical wrap, having a pitch of 6.85° with respect to vertical. A turning speed of one revolution per 6 minutes enabled the 38 inch wide material to be manually applied with a 2 inch overlap. The helical winding was continued to the opposite end where the final wrap was made circumferential.

The deflecting or third ply was then cut-off from the coating apparatus. After the underlying second or bridging ply was found to be thoroughly resin-impregnated by capillarity, the cut end of the third ply was brushed with a cobalt solution to accelerate gel and cure, thereby assuring that bunching or loosening of the glass strands did not occur. While the tank cylinder portion cured at room temperature, tank end fabric 35 was given three brush coats of unthinned polyester resin. To accelerate gel of each successive coat, the resin was further promoted by adding 1 cc of a 4:1 cobalt napthenate-dimethyl aniline mixture to each 3 pounds of polyester resin prior to catalyzing with 2% MEKP. After applying three coats, the tank ends became smooth and glossy and the fabric texture disappeared. Such appearance gave assurance that the ends were free of pin hole leaks prior to subsequent pressure testing.

The exampled gasoline storage tank is intended to protect underground municipal water supplies and sewage systems from gasoline contamination caused, at present, by leaking steel tanks which have corroded during service. The tank disclosed in this example has successfully passed all subject 58 tests required by Underwriters' Laboratories, Inc. to obtain listing with U.L. as an underground non-metallic tank for storage of petroleum products. The tank construction has demonstrated the feasibility of using integral forming structure to resist compression loads, a corrugated plastic laminate shell formed thereon to resist pressure and impact loads and the combination of laminate shell and forming structure to resist bending and buckling loads.

If desired, a fourth ply of resin impregnated glass fabric can be applied to the exampled tank to afford the underlying plies with added protection during storage, shipping, and installation of the tank. The exampled tank can also be configured to serve as a vertical tank for storage of corrosive chemicals. Such chemical tanks would be normally made without hemispherical end structure and with the internal ring and longeron members bolted or clamped for disassembly and removal. With minor modifications, the internal ring and longeron structure could be removed and used as exterior structure to aid shipment, installation and support of the thin wall corrugated plastic laminate tank shell.

EXAMPLE IV

FIG. 23 illustrates a reuseable mandrel for forming an impermeable corrugated shell structure thereon. The two-part cylindrical mandrel comprised a 20 foot long cylindrical form 37 surface and a 1 foot long gripping and tensioning form 38 attached together by a removable bolt 39. The assembled mandrel was mounted on appropriate turning apparatus (not shown) to rotate the mandrel during fabrication of the composite structure.

The smooth and polished cylindrical forming surface of form 37, having a 24 in. O.D., was first cleaned, waxed, polished and spray-coated with a water soluble release agent, such as polyvinyl alcohol (PVA). After the release agent was dry, a thin 5 mil gel coat of thixotropic polyester resin 6 was sprayed upon the left end of the mandrel's forming surface. A first ply of dry and closely compacted bridging strands 1, formed into two 38 in. wide pieces of unidirectional strength glass fabric, was longitudinally placed on and adhesively secured to the left end of the mandrel by resin coating 6.

The rightward ends of the strands, bridging across annular forming and support rings 3i, were secured to form 38 by a multiple ply of circumferentially wrapped polyester resin-impregnated glass deflecting strands 33 at annular gripping gap 40. In addition to the gripping function, strands 33 functioned to uniformly tension dry strands 1 between the gripping ends of the mandrel. Strands 33 were brushed with a solution of cobalt napthenate thinned with styrene monomer to quickly gel and harden the resin to expeditiously form gripping means thereat.

The superimposed second ply comprised resin-impregnated glass strands 2, formed into an endless 3 in. wide warp having 36 strands of 8 end glass roving, helically wound upon the underlying dry strands after an initial one turn circumferential wrapping. The helical wrapping was initiated at the left end of the mandrel, rotated at 6 r.p.m., and progressed rightwardly thereon at 1 warp width (3 in.) per mandrel revolution. The final wrap of the deflecting strands served to deflect the underlying bridging strands into the forming gap adjacent to gripping gap 40. The wrapping produced a tension in each strand 2 and 33 of approximately 2.0 lb. which was sufficient for deflecting, compacting, impregnating and tensioning of the underlying bridging strands. The dry first or bridging ply has an approximate initial thickness of 24 mils (0.024 in.) and of 12 mils after it was resin-impregnated and compacted. The resin-impregnated deflecting strands were squeezed through rollers spaced 16 mils apart to provide a sufficient surplus of boundary layer lubricating resin (FIG. 7) and to also impregnate the bridging strands.

After capillarity was allowed to impregnate the first ply with resin, the resin was cured and hardened. Pin 39 was then removed and end 41 of form 37 was anchored to prevent the mandrel from rotating. The mandrel's pull end 42 was attached to a suitable take-up device, such as a winch, and the corrugated shell and form 38 was separated simultaneously from form 37. The formed tubular structure was then removed from the corrugation form by disassembling same and the corrugated end was severed and discarded.

The 60,000 individual glass filament strands comprising the second ply arranged themselves approximately in 1400 rows containing 40 filaments each. The interstices were found to be uniformly filled with resin and hydrostatic burst tests performed on the formed 24 inch O.D. shell demonstrated a resistance to internal pressures in excess of 115 psi. The longitudinal second ply filament reinforcements were found to completely prevent the interlaminar shear type failure which is characteristic with regard to conventional filament wound tubes.

The exampled structure also demonstrated a high weep strength and a high resistance to twisting and warpage, characteristic of long pipe lines made of filament wound laminate structure. It was also found that the second ply resisted a tensile force of 1,380 pounds per inch of width. The 20 mil thick second ply thus exhibited a composite strength exceeding 68,000 psi. The test also demonstrated that compacted "K"-type filaments bonded by resin can resist approximately a third of an ounce per individual filament having a diameter of half a mil.

FIG. 24 illustrates a high tensile strength joint comprising a corrugated shell for connecting and insulating dissimilar (e.g., steel and aluminum) metallic end coupling members 44 and 44a and a non-metallic cylindrical spacer or tube 45. Coupling member 44 has a flange formed integrally therewith whereas coupling member 44a is internally threaded. The tube may comprise a filament wound glass reinforced epoxy designed to absorb shock and impact loading, resist compression loading and to insulate and prevent galvanic corrosion of the coupling members. The coupling members may be otherwise constructed to axially join other structures thereto.

EXAMPLE V

A first ply of dry bridging strands 1 was longitudinally placed upon the coupling members and spacer to bridge annular support and forming members 3J. The free ends of the bridging strands were gripped and deflected by wrapping resin-impregnated deflecting and tensioning strands 33 over the two axially outermost forming and tensioning gaps 11. Capillarity functioned to impregnate the underlying dry bridging strands which were deflected into the outermost forming gaps for gripping purposes. Strands 33 thus functioned to place the intermediate portions of strands 1 in tension.

Maximum bridging strand gripping tension was obtained by allowing the resin to cure and harden prior to the spiral wrapping of a second ply of resin-impregnated deflecting strands 2 thereon. The remaining dry bridging strands were resin-impregnated by capillarity and were deflected into the two axially innermost forming gaps 11. The resulting shell structure thus comprised a centrally disposed cylindrical section connected between corrugated end sections, each exhibiting two concave parabolic configurations.

The bonding resins used in the exampled construction were bisphenol A type low viscosity resins which cured at room temperature and had working pot lives of approximately 20 minutes. Members 44 and 44a were constructed with 12 inch diameters, measured at the outside of annular forming members 3J, and an 8 inch I.D. The width of each gap 11 approximated 3 inches, the radius of each member 3J ½ inch, the wall thickness members 40 and 4a 1 inch and the overall length of each member was 12 inches.

The length of spacer 45 was 18 inches, its outside diameter 12 inches and its inside diameter 10 inches. The entire assembly was first mounted on a support and turning apparatus. The exterior surfaces of the members and spacer were coated with an epoxy resin. Before the resin hardened, a distensible first ply of glass cloth fabric was placed upon the epoxy resin and absorbed the resin to form a taut resin impregnated layer extending the complete length of the joint. The first ply comprised a single width of 38 inch wide glass cloth, wrapped about mandrel elements 44, 44a and 45 and overlapped 2 inches.

After the epoxy resin hardened, the first ply was given an exterior coat of the same epoxy resin composition until it was assured that the surface was uniformly glossy and contained no pin holes. While the resin was still tacky, a second fabric ply of dry bridging strands 1 was placed upon the uncured epoxy resin surface so that the strands were oriented parallel to the mandrel winding axis. The second ply was placed so that it extended approximately 2 inches beyond each end of the mandrel elements.

Three turns of 36 resin impregnated deflecting strands 33 of continuous glass roving was next wound upon the ends of dry strands 1 to firmly grip and hold the same. Beginning at one end, an epoxy resin-impregnated third or deflecting ply, made into a 3 inch width, was wound upon the rotating mandrel so that the individual widths were laid in a side-by-side butting-edge sequence and pattern. After the epoxy resin was allowed to cure for 24 hours at room temperature, the mandrel elements became joined and sealed to form an insulated composite structure capable of resisting high tensile forces.

The joint is designed to resist a tensile strength primarily governed by the tensile strength of strands 2 of the deflecting or second ply rather than by the strength of strands 1 of the bridging or third ply. Failure of the joint would normally require failure of strands 2 to allow one of joint members 44 and 44a to slip out of the enclosing sheath of the portions of the deflected bridging strands accommodated in forming gaps 11.

The pressure imposed upon strands 2 can be determined by calculating the value of deflecting pressure $P_D$ from the previously explained relationships depicted in FIG. 1 and FIG. 2. The following analysis, developed for the exampled joint depicted in FIG. 24, is based upon the following: H = 0.20 inch, G = 3 inches, $a$ = 30°, desired tensile load at joint failure = 20,000 pounds. The load of 20,000 pounds is insufficient to cause failure in bridging strands 1, but produces a gripping strength $T_G$ of 530 pounds per inch of joint circumference. For a wrap angle $a$ of 30° and a friction coefficient of 0.36, the value of $e^{fa}$ is approximately 1.21 and $T_B$ equals 641 pounds per inch.

The horizontal component, $T_{BH}$, equals $T_B \cos 30°$ or 555 pounds per inch. By definition, the parabolic deflection curve 4 has a focus to directrix distance $p$ which equals the ratio $G^2/8H$ as well as the ratio $T_{BH}/P_D$. For the parabolic section contour curve of the corrugated plastic laminate of this example, $p$ equals 9/1.6 or 5.625. The equation of a parabolic curve, having its vertex at the origin of an X-Y coordinate system, is $X^2 = 11.25Y$. The corresponding value of $P_D$ equals $T_{BH}/5.625$ or 98.66 pounds per square inch. Since the corrugated laminate hoop strength $h$ is approximately 50,000 psi, by reason of the classical formula, $h = PR/t$, where $P$ equals pipe pressure, $R$ equals Pipe radius and $t$ equals Pipe wall thickness, the relationship applicable for determining strength of corrugated laminate employed in pipe joint is $h = P_D D/2t$ where $t$ is the thickness of the deflecting warp 2, and $D$ is the diameter of the laminate corrugation at the metal support.

By this formula, it can be shown that $t = P_D D/100,000 = 0.0118$ inches. By these relationships a deflecting warp having a thickness of only 12 mils will not fail until the exampled joint construction is loaded by the very high tensile pull of ten tons. This example illustrates the unique relationships between end loads imposed upon structurs connected by a corrugated plastic laminate made in accordance with the teachings of this invention.

I claim:

1. An apparatus for forming a composite structure thereon comprising
    a mandrel comprising separable parts releasably attached together in axial alignment by fastening means, said mandrel mounted on a longitudinal axis thereof and having an annular cross section throughout its length,
    at least one pair of annular support means spaced apart longitudinally on the periphery of one of the parts of said mandrel,
    each of said support means extending radially outwardly from said axis and terminating at a convex surface,
    the radial heights of said support means being sufficient to form a forming gap therebetween adapted to receive deflected portions of a formed composite structure therein.

2. The invention of claim 1 wherein said mandrel comprises equally spaced pairs of support means thereon.

3. The invention of claim 1 wherein only one of said parts has said support means thereon, said other part having a smooth and continuous outer surface.

4. The invention of claim 3 wherein said other part is tapered down longitudinally toward said one of said parts.

5. The invention of claim 3 wherein said other part is cylindrical.

* * * * *